(12) United States Patent
VanConett

(10) Patent No.: US 8,631,815 B2
(45) Date of Patent: Jan. 21, 2014

(54) PUMP ATTACHMENT INTERFACE PROVIDING A FIXED LINK BETWEEN A PUMP LINE COUPLED TO A MOBILE TANK AND A LINE DISPOSED IN A RESERVOIR

(76) Inventor: Randal K. VanConett, Grand Junction, CO (US)

(*) Notice: Subject to any disclaimer, the term of this patent is extended or adjusted under 35 U.S.C. 154(b) by 264 days.

(21) Appl. No.: 13/013,343

(22) Filed: Jan. 25, 2011

(65) Prior Publication Data
US 2012/0187676 A1    Jul. 26, 2012

(51) Int. Cl.
F16K 23/00    (2006.01)
E03B 7/00    (2006.01)
F17D 1/08    (2006.01)

(52) U.S. Cl.
USPC ............... 137/312; 137/236.1; 137/565.01

(58) Field of Classification Search
USPC ............. 137/236.1, 312, 565.01, 590, 356; 405/36
See application file for complete search history.

(56) References Cited

U.S. PATENT DOCUMENTS

| | | | |
|---|---|---|---|
| 3,613,894 A | 10/1971 | Clegg | |
| 3,690,463 A | 9/1972 | O'Brien | |
| 3,734,138 A * | 5/1973 | Brown et al. | 138/106 |
| 3,778,948 A | 12/1973 | Berthier | |
| 4,019,830 A | 4/1977 | Reid | |
| 4,138,042 A | 2/1979 | Okada | |
| 4,179,379 A | 12/1979 | Mitchell | |
| 4,180,348 A | 12/1979 | Taylor | |
| 4,449,849 A | 5/1984 | Horn et al. | |
| 4,659,293 A | 4/1987 | Evenson | |
| 4,874,133 A | 10/1989 | Gethke et al. | |
| 5,082,013 A | 1/1992 | Scheib | |
| 5,108,591 A | 4/1992 | Hagan | |
| 5,255,999 A | 10/1993 | Perslow | |
| 5,299,709 A * | 4/1994 | Beerbower et al. | 137/356 |
| 5,311,909 A * | 5/1994 | Adcock | 137/899 |

(Continued)

FOREIGN PATENT DOCUMENTS

EP    0372963 A1    6/1990
EP    0439890 A1    8/1991

(Continued)

OTHER PUBLICATIONS http://www.manuremanager.com/content/view/1168/38/, Sep. 3, 2010, Liquid Waste Technology LLC.

(Continued)

*Primary Examiner* — John Rivell
*Assistant Examiner* — Michael R Reid
(74) *Attorney, Agent, or Firm* — Russ Weinzimmer & Associates P.C.

(57) ABSTRACT

A pump attachment interface provides a fixed link between a first line in communication with a fluid reservoir, and a second line in communication with a mobile storage tank via a pump of a pump truck. The interface includes an interface body with a sloping surface that supports a fixed conduit such that a lower end of the conduit is at a height that is lower than an upper end of the conduit. The lower end is for coupling to the first line, and the second end is for coupling to the second line. The attachment interface also has a spill containment catch basin over which the second end of the conduit is located so as to catch any spillage from the second line when it is coupled to the conduit. The body can be a concrete block, or be molded plastic filled with sand or water.

20 Claims, 5 Drawing Sheets

(56) References Cited

U.S. PATENT DOCUMENTS

| | | |
|---|---|---|
| 5,392,806 A | 2/1995 | Gallant |
| 5,470,011 A | 11/1995 | Jordan |
| 5,509,437 A | 4/1996 | Merrett |
| 5,527,130 A | 6/1996 | Webb |
| 5,618,166 A | 4/1997 | Legett et al. |
| 5,624,241 A | 4/1997 | Nesseth |
| 5,647,412 A * | 7/1997 | Brewer .................... 141/86 |
| 5,797,421 A | 8/1998 | Merrett |
| 5,955,657 A | 9/1999 | Bravo |
| 6,000,428 A | 12/1999 | Berberat |
| 6,308,753 B1 | 10/2001 | Nimberger et al. |
| 6,386,049 B1 | 5/2002 | Schrumm |
| 6,619,596 B1 * | 9/2003 | Caine et al. ............... 248/49 |
| 6,698,461 B1 | 3/2004 | Bryan et al. |
| 6,701,982 B1 | 3/2004 | Ortiz et al. |
| 6,988,874 B2 | 1/2006 | Spargo |
| 7,107,406 B2 | 9/2006 | Kurasugi |
| 7,195,284 B2 | 3/2007 | Garton et al. |
| 7,299,822 B2 | 11/2007 | Wall |
| 7,575,677 B1 | 8/2009 | Barnes |
| 7,604,710 B2 | 10/2009 | Haslem et al. |
| 2007/0210215 A1 * | 9/2007 | Prest ........................ 248/80 |
| 2008/0061010 A1 | 3/2008 | Tom |
| 2008/0223468 A1 * | 9/2008 | Stegall ...................... 137/899 |
| 2008/0283623 A1 | 11/2008 | Haslem et al. |
| 2010/0200516 A1 | 8/2010 | Hwang |

FOREIGN PATENT DOCUMENTS

| | | |
|---|---|---|
| EP | 0508680 A1 | 4/1992 |
| EP | 0486168 A1 | 5/1992 |
| EP | 1939392 A2 | 12/2006 |
| EP | 2175071 A1 | 4/2010 |
| GB | 2426310 A1 | 11/2006 |
| WO | 2005088071 A1 | 9/2005 |
| WO | 2007030841 A1 | 3/2007 |

OTHER PUBLICATIONS http://www.ponddampiping.com, Sep. 3, 2010, Pond Dam Piping, Ltd.

http://pubs.acs.org/doi/pdf/10.1021/es00107a011, Sep. 3, 2010, A deep-towed pumping system for continuous underway sampling.

http://www.portablewinch.com/en/06.asp#photos, Sep. 3, 2010, Pull Anything Anywhere!

* cited by examiner

SECTION A-A

PUMP ATTACHMENT INTERFACE PROVIDING A FIXED LINK BETWEEN A PUMP LINE COUPLED TO A MOBILE TANK AND A LINE DISPOSED IN A RESERVOIR

FIELD OF THE INVENTION

This invention relates to providing water at remote locations for purposes such as drilling oil and gas wells and fighting forest fires, and more particularly to facilitating the transport of the water to and from temporary storage ponds or drill pits located at the remote locations by way of pump trucks.

BACKGROUND OF THE INVENTION

Very large quantities of water are required to support oil and gas well drilling operations. Because the drilling sites are often located in remote and dry areas, water must be transported to the drilling sites at significant expense. The water is typically brought to a location that is near or central to a number of drilling sites using several pump trucks, and then stored in man-made ponds often referred to as drill pits. Pump trucks are then used to pump water from the drill pit and to transport the water to a particular drill site as needed to support the drilling operation. To minimize expense, the water is typically recovered during the drilling operation and returned by the pump truck back to the drill pit for future use at that or other drilling sites. The water from one drill pit may even be moved to another drill pit when, for example, operations are winding down at one location but are ramping up at another.

Drilling operations are very dirty, and the recovered water is typically contaminated with chemical byproducts and hydrocarbons associated with the drilling process. Drill pits therefore have recently fallen under severe scrutiny by various environmental regulatory agencies. A number of precautionary measures must be taken, to comply with environmental regulations established by those agencies, to ensure that the recycled water does not contaminate the surrounding ecosystem or otherwise harm wildlife.

One requirement is that the drill pits be lined to prevent the contaminated water from seeping into the ground and eventually contaminating the groundwater. Another requirement is that the drill pits be covered with netting to prevent wildlife from attempting to access the water either for drinking, bathing, and in the case of waterfowl, landing.

Typically, a pump truck is dispatched to either deliver water to a drill pit or to draw water therefrom. The operator backs the truck up to the drill pit, pulls out a line (usually a hose or some form of flexible tubing) that is in communication with the tank of the pump truck through a pump, and the operator casts the free end of the line into the drill pit. This process is often made more difficult in that the line must be first disposed through the protective netting. This makes access to the water more difficult and can cause damage to the netting.

The end of the line also tends to be dragged across the bottom of the pond, especially during withdrawal of the line by the operator. This can cause further damage to the netting, and to the protective liner at the bottom of the pit. As the line is removed from the pit and refracted for transport, it is dragged across the ground and water remaining in and on the line can contaminate the ground surrounding the pit. Sometimes the operator forgets that the line is still in the drill pit and starts to drive off without first removing the line, causing the end of the line to drag along the pit liner, as well as to spill water remaining in the line onto the ground as it emerges from the pond or drill pit.

Lines are sometimes left at the drill pit on a semi-permanent basis, one end disposed through the netting and into the drill pit, the other end left lying on the ground to which the pump truck lines can be coupled. This eliminates having operators constantly deploying and withdrawing their pump lines into and out of the drill pits.

Notwithstanding, an operator does not always position the truck with enough slack, because it is hard to tell where the end of the line is and how much slack is available in that line from inside the truck. Thus, the operator is sometimes tempted to pull on the line disposed in the drill pit to create the necessary slack to facilitate the coupling of the pump truck line to the end left on the ground. Operators also can and still do forget to decouple their truck's pump line from the line disposed in the pit and start to pull away. The end of the line in the pit can be dragged across the pond liner, potentially causing damage to the pit liner and therefore leaks of the contaminated water.

Finally, there is still a significant likelihood that spillage of contaminated water, remaining in the hoses after the pumping process is complete, will occur when the operator connects or disconnects the pump truck line from the line disposed in the pond or drill pit. This can and does lead to environmental contamination of the area around the pond or drill pit in violation of environmental regulations.

SUMMARY OF THE INVENTION

A pump attachment interface provides a fixed link between a line having one of its ends permanently or semi-permanently disposed in a pond or drill pit and a pump line through which water can be pumped into or out of a mobile reservoir, such as a tank mounted on a pump truck. The pump attachment interface provides a fixed connection target for the operator of a pump truck to back up to and to which to connect and disconnect the pump line. This is accomplished by disposing a conduit on or within a sloping surface of an interface body and at an angle so that the upper connection to which the pump truck line is to be connected is elevated up off of the ground and at height that is easy to see from the cab and easy to reach. The lower connection is also elevated from the ground for easy connection to the line disposed in the pit or pond.

The interface body provides enough mass and weight to render the elevated connection point substantially stable in the environment in which the interface is deployed. The mass and weight of the interface body also resists movement if bumped by pump trucks backing up to it, or if pulled by operators attempting to pull away before the pump truck line has been disengaged from the conduit of the interface. These features help to reduce, if not eliminate, any breaches in the required netting over the drill pit, and/or in the liner at the bottom of the drill pit or pond.

The pump attachment interface can further include a spill containment catch basin that is disposed in a manner at the upper connection end of the fixed link such that any spillage of contaminated water that may occur when the operator is coupling or decoupling the pump truck hose from the elevated connection is spilled into the catch basin. This feature significantly reduces, if not eliminates the possibility of environmental contamination of the ground area near the perimeter of the drill pit or pond.

In an embodiment, a pump attachment interface provides a fixed link between a first line in communication with a fluid reservoir and a second line in communication with a mobile storage tank through a pump. The interface includes an interface body having a sloping surface and a conduit. The conduit is supported by the sloping surface such that a lower end of the conduit is at a height that is lower than an upper end of the conduit, the lower end capable of being coupled to the first line and the second end capable of being coupled to the second line. The interface further includes a spill containment catch basin, and the upper end of the conduit is disposed over the bottom of the catch basin.

In an embodiment, the interface body is made of concrete and has sufficient weight to substantially isolate the first line from pulling forces exerted on the second line. In another embodiment, the fixed conduit is supported by the sloping surface within a channel formed in the sloping surface. In an embodiment, the catch basin is a bucket, and the upper end of the conduit is located inside the bucket.

In another embodiment, the interface body is made of molded plastic. In other aspects of the invention, the interface body is hollow and can be filled with a weighting material such that the interface body has sufficient weight to substantially isolate the first line from pulling forces exerted on the second line. In another embodiment, the spill containment basin is integrally formed within the interface body. In a further embodiment, the conduit is made of aluminum. In another aspect of the invention, the pump attachment includes lifting rings that are embedded in a top surface of the interface body.

In another embodiment, a pump attachment interface provides a fixed link between a first line in communication with a fluid reservoir and a second line in communication with a mobile storage tank through a pump. The attachment interface has an interface body that has a sloping surface. The interface body is made of molded plastic. A conduit is supported by the sloping surface such that a lower end of the conduit is at a lower height than an upper end of the conduit. The lower end is capable of being coupled to the first line and the second end is capable of being coupled to the second line. The attachment interface also has a spill containment catch basin that is integrally formed within the interface body. The upper end of the conduit is disposed over the catch basin.

In an embodiment, the interface body is hollow and is capable of being filled with a weighting material such that the interface body has sufficient weight to substantially isolate the first line from pulling forces exerted on the second line. In another aspect, the interface body has first plug through which the weighting material may be introduced into the attachment body, and a second plug through which the weighting material may be removed from the attachment body. In an embodiment, the weighting material is water. In another embodiment, the height of the upper end of the conduit is conveniently reached by a user standing on the ground. In an embodiment, the conduit is supported by the sloping surface within a channel integrally formed within the sloping surface, and the conduit is retained within the channel by forces exerted by the walls of the channel.

In a further embodiment, a pump attachment interface provides a fixed link between a first line in communication with a fluid reservoir and a second line in communication with a mobile storage tank through a pump. The attachment interface includes an interface body that has a sloping surface and the interface body is made of concrete. The attachment interface also has a conduit that is supported by the sloping surface such that a lower end of the conduit is at a lower height than an upper end of the conduit. The lower end is capable of being coupled to the first line and the upper end is capable of being coupled to the second line. The attachment interface further includes a spill containment catch basin. The catch basin is supported within a spill containment space of the attachment body. The upper end of the conduit is disposed through and within the catch basin.

In an embodiment, the interface body has sufficient weight to substantially isolate the first line from pulling forces exerted on the second line. In another embodiment, the conduit is supported by the sloping surface within a channel formed within the sloping surface, and is retained in the channel by at least one clamping means.

BRIEF DESCRIPTION OF THE DRAWINGS

The invention will be more fully understood with reference to the Detailed Description, in conjunction with the following figures, wherein.

DETAILED DESCRIPTION

Figure 1:
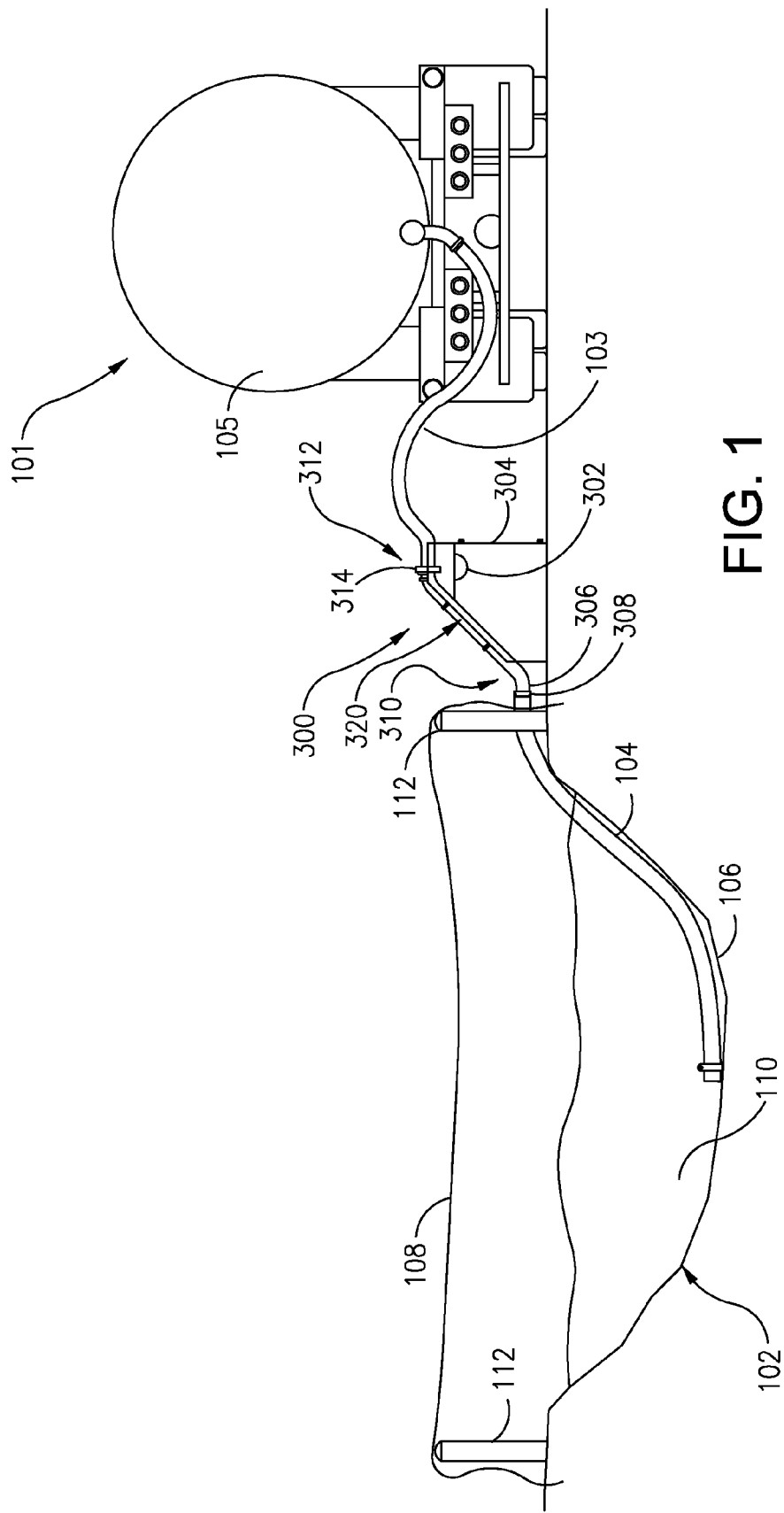
FIG. 1 is a perspective view of a pond or drill pit having one end of a line disposed therein, and an embodiment of the invention providing a fixed link thereto coupled to the other end of the line, and further providing a coupling to a pump line of a pump truck.

FIG. 1 illustrates a typical environment in which an embodiment of the pump attachment interface 300 might be deployed. A cross-sectional view of a pond or drill pit 102 is shown, containing water 110 and covered by protective net 108 as supported by support members 112. Pond or drill pit 102 has a protective liner 106 that lines the bottom of drill pit 102 to prevent the water 110 from escaping into the ground. One end of a first line 104 is semi-permanently disposed through the netting (not shown) and into the pit 102, the other end being coupled to a lower end 310 of a conduit 306 of the attachment interface 300 at coupling 308. In an embodiment, the conduit 306 is shown supported by a sloped surface 320 of interface body 304. The upper end 312 of conduit 306 is elevated by the sloped surface 320 to a level substantially above the lower end 310 and is shown having a coupling 314 disposed above a spill containment catch basin 302. The sloped surface 320 of the interface body 304 stops before reaching the ground, thereby elevating the lower end 310, and coupling 308 of the conduit 306 off of the ground as well.

A second line, pump line 103 of pump truck 101, is coupled to the upper coupling 314 of the fixed link of the attachment interface of the invention 300. The pump line 103 is typically connected to tank 105 of pump truck 101 through a pumping mechanism (not shown). Water 110 can be pumped from the drill pit 102 and into tank 105 of pump truck 101, or from the tank 105 and back into drill pit 102, all through the fixed link of the attachment interface of the invention 300.

Figure 2A:
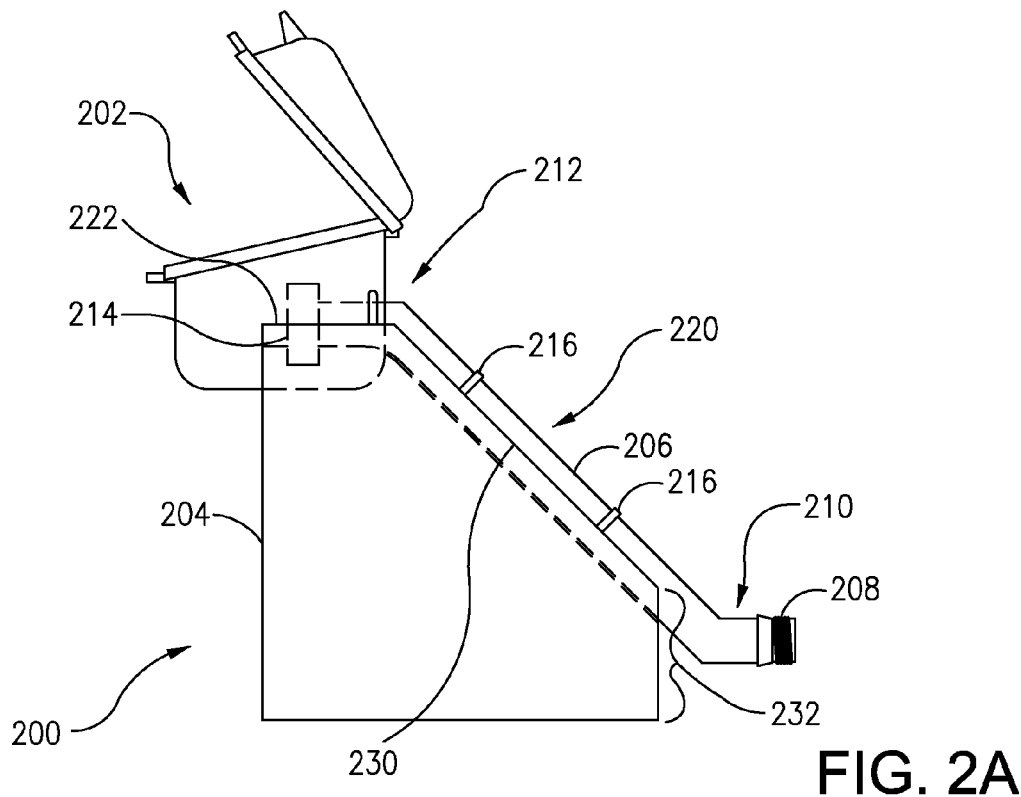
FIG. 2A is a side view of an embodiment of the invention.

FIG. 2A is a diagram showing a side view of an embodiment of the attachment interface of the invention 200. Interface body 204 has a sloping surface 220. In an embodiment, the interface body 204 can be a cement block consisting of approximately 0.75 yards of six sack concrete with fibermesh and can weigh approximately 2550 pounds. The weight and mass of the attachment interface 200 therefore provides a stable platform that can serve to isolate the semi-permanently disposed first line 104 (FIG. 1) from being pulled by the operator or the operator's truck. Attachment interface 200 therefore also provides a stable and elevated target for the pump truck operator to back up to. The upper end of the conduit is also at a height that provides easy access to the operator.

The sloping surface 220 can be formed at any suitable angle to a plane parallel with the ground, such as forty-five degrees. Conduit 206 is at least partially supported by the sloping surface 220 and can be secured thereto by clamps 216. In an embodiment, the conduit 206 can be disposed inside of a channel 230 in the sloping surface 220 such that the conduit 206 is at least partially recessed inside of sloping surface 220 as illustrated.

In an embodiment, the sloping surface 220 does not reach all the way to the ground, but ends at a vertical surface 232 that is substantially perpendicular to the ground. Vertical surface 232 is of a height sufficient to elevate the lower end 210 of conduit 206 above the ground. Conduit 206 is of a length such that its lower end 210 extends just beyond the end of the sloping surface 220 and the beginning of vertical surface 232. In an embodiment, the conduit 206 can have an elbow bend at an angle substantially equivalent to the angle of the sloping surface 220 such that the portion of lower end 210 of conduit 206, after the elbow bend, is roughly parallel to the ground as illustrated. This makes adapter fitting 208 more easily accessible for coupling to a first line, the other end of which is disposed in a pond or drill pit. This also ensures that the coupling is not lying on or near the ground.

In an embodiment, the top of the sloping surface meets a top surface 222 that is parallel with the ground. Channel 230 extends from sloping surface 206 into top surface 222 to receive the upper end 212 of conduit 206. An elbow bend can render upper end 212 substantially parallel with the top surface 222 and the ground as well. This makes adapter fitting 214 more easily accessible for coupling to a second or pump line, in communication with a mobile storage tank through a pumping mechanism. Channel 230 can be deepened and widened into spill containment space (218, see FIGS. 2B and 2C) which is of sufficient size to receive a spill containment catch component 202 that can be fixably disposed under fitting 214 to catch any water that may spill from the pump line as it is decoupled from the fitting. The catch basin can be of any design, such as the "Pumpkin" spill containment system manufactured by Renegade Oilfield Products, LLC in Beaumont, Tex.

In an embodiment, the conduit 206 can be made of a non-corrosive material such as aluminum. The conduit can be of a suitable diameter, such as four inches. In an embodiment, the width of the channel 230 can be just larger than the diameter of conduit 206 so that once conduit 206 is seated within channel 230 through slight deformation of the diameter of the conduit, the sides of channel 230 provide additional gripping force to help clamping means 216 retain the conduit 206 in channel 230. Clamping means 216 can be any suitable structure that might be employed to retain conduit 206 within channel 230, including brackets, ties, clamps, etc.

Figure 3:
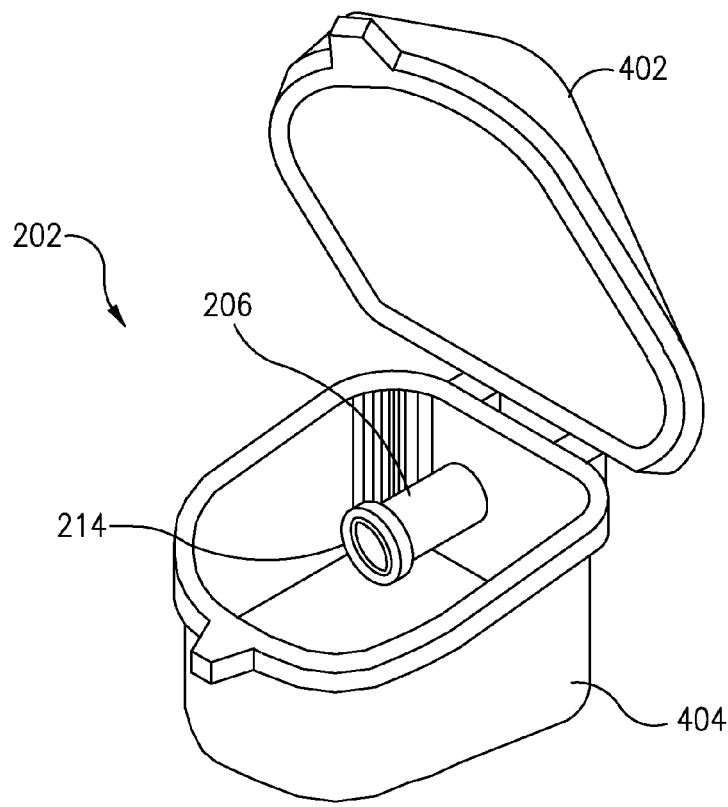
FIG. 3 is a perspective view of a spill containment catch basin with lid open that can be employed as a component in the embodiment of the invention of FIGS. 2A-C.

FIG. 3 shows a perspective view of an embodiment of a spill containment component 202, as it would appear with upper end 212 (see FIG. 2A) of conduit 206 disposed therethrough. Because the coupling must be made between a pump line and fitting 214 inside of the component 202, water remaining in the lines can be caught within the component 202 while making or breaking the connection. The spill containment component 202 includes a hingeable lid 402 and a body 404, and can be made of any suitable non-reactive plastic or metal such as aluminum.

Figure 2B:
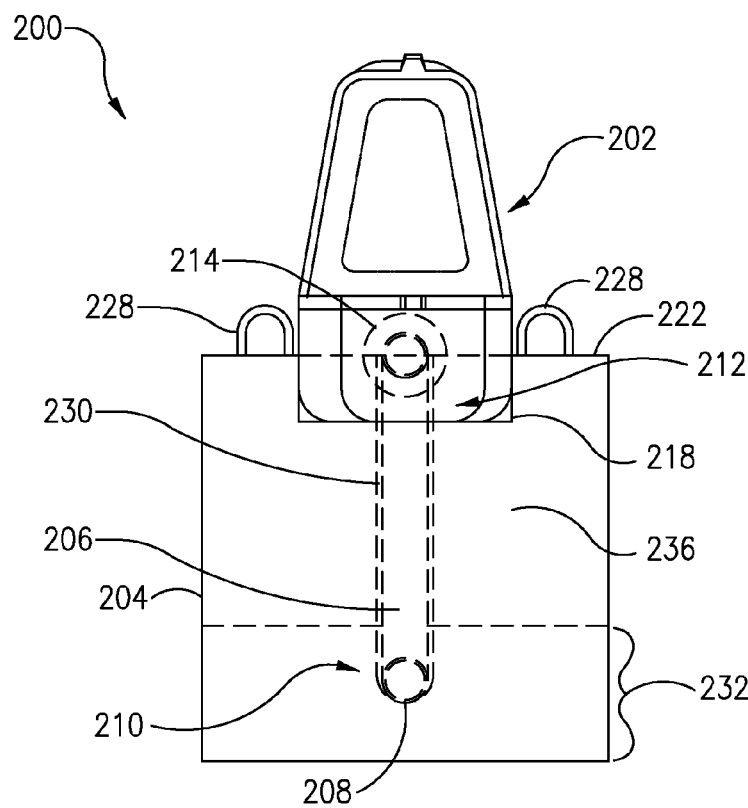
FIG. 2B is a front view of an embodiment of the invention as viewed from the perspective of a pump truck operator.

FIG. 2B is a front view of an embodiment of the pump attachment interface 200 from the perspective of a pumping truck operator. This view shows a front surface 236 that extends from the ground to the top surface 222, and shows fitting 214 of the upper end 212 (see FIG. 2A) of conduit 206 as it would appear to a pump truck operator. The positions of channel 230, conduit 206, lower end 210, coupling 208 and vertical surface 232, all blocked from view by front surface 236, are shown by dashed lines. The cover of spill containment component 202, which is disposed in spill containment space 218 is open to permit access to fitting 214.

Figure 2C:
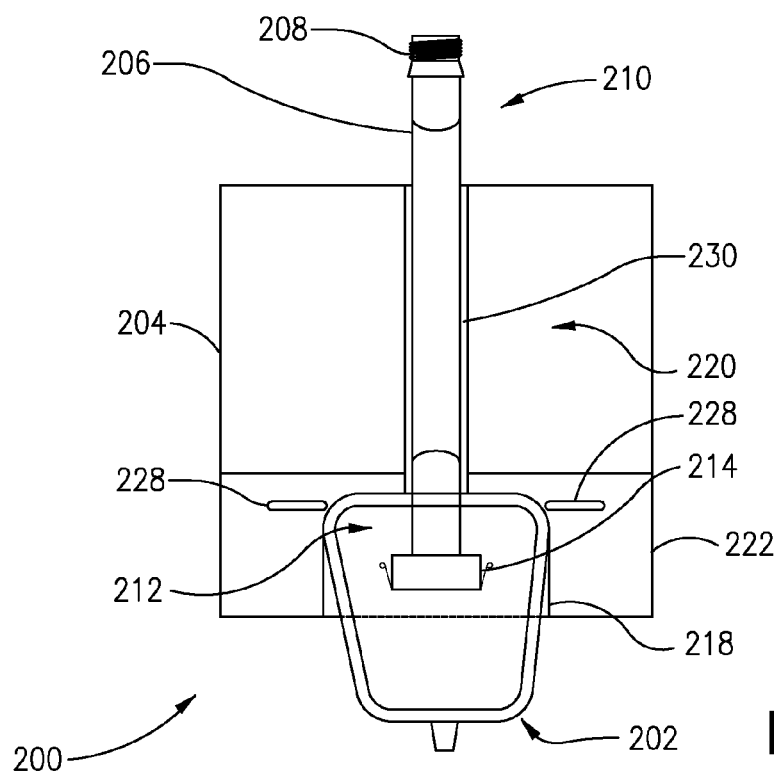
FIG. 2C is a top view of an embodiment of the invention.

FIG. 2C shows a top view of an embodiment of the pump attachment interface 200. Interface body 204 is shown, having top surface 222, spill containment space 218 therein, which narrows to channel 230, which extends down the length of sloping surface 220. Conduit 206 is disposed on and supported by sloping surface 220, within channel 230. Upper end 212 of conduit 206, having female fitting 214, is disposed within spill containment space 218, and lower end 210 extends beyond the end of sloping surface 220 so that adapter fitting 208 is readily accessible. Rebar lifting rings 228 are provided in the top of surface 222 so that the attachment interface 200 can be more easily lifted and placed into position by, for example, a fork-lift truck.

Figure 4A:
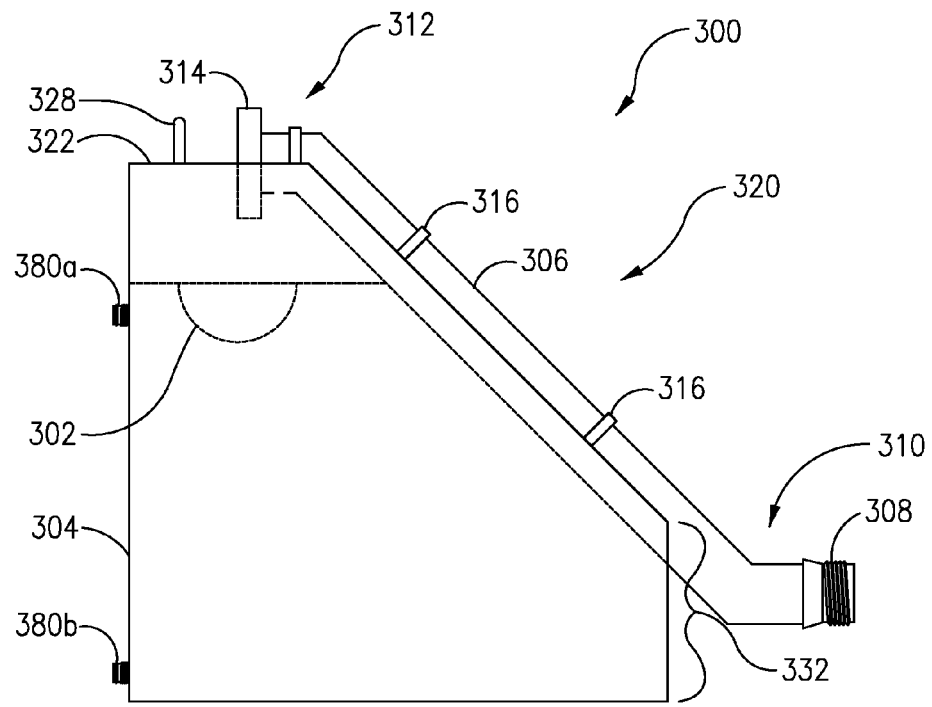
FIG. 4A is a side view showing a spill containment basin that is integral with an molded interface body of an embodiment of the invention.

FIG. 4A shows a side view of an embodiment of the pump attachment interface 300 where channel 330 (see FIG. 4B), spill containment space 318 (see FIG. 4B) and spill containment basin 302 are integral with the interface body 304. The interface body 304 can be made of a substantially non-reactive molded plastic or other suitable material that is corrosion resistant or substantially non-reactive. The channel 330 (see FIG. 4B), spill containment space 318 (see FIG. 4B) and spill containment basin 302 are all integrally formed therein by a molding process.

Interface body 304 has a sloping surface 320. The sloping surface 320 can be formed at any suitable angle to a plane parallel with the ground, such as forty-five degrees. Conduit 306 is at least partially supported by the sloping surface 320 and can be secured thereto by clamps 316. In an embodiment, the conduit 306 can be disposed inside of a channel 330 (see FIG. 4B) in the sloping surface 320 such that the conduit 306 is at least partially recessed inside of sloping surface 320 as illustrated.

In an embodiment, the sloping surface does not reach all the way to the ground, but ends at a vertical surface 332 that is substantially perpendicular to the ground. Vertical surface 332 is of a height sufficient to elevate the lower end 310 of conduit 306 above the ground. Conduit 306 is of a length such that its lower end 310 extends just beyond the end of the sloping surface 320 and the beginning of vertical surface 332. In an embodiment, the conduit can have an elbow bend at an angle substantially equivalent to the angle of the sloping surface 320 such that the portion of lower end 320 of conduit 306, after the elbow bend, is roughly parallel to the ground.

This makes adapter fitting 308 more easily accessible for coupling to a line, the other end of which is disposed in a pond or drill pit.

In an embodiment, the top of the sloping surface 320 meets a top surface 322 that can be substantially parallel with the ground. Channel 330 (see FIG. 4B) extends from sloping surface 320 into top surface 322 to receive the upper end 312 of conduit 306. An elbow bend can render upper end 312 substantially parallel with the top surface 322 and the ground as well. This makes adapter fitting 314 more easily accessible for coupling to a line, the other end of which can be coupled to a pump line 103 (FIG. 1) in communication with a mobile storage tank 105 (see FIG. 1) through a pump. Channel 330 can be deepened and widened into spill containment space 318, which is of sufficient size to form spill containment catch basin 302. Fitting 314 of conduit 306 can be disposed in spill containment space 318 and over spill containment basin 302 to catch any water that may spill from the pump line as it is coupled or decoupled from the fitting 314. A hingeable cover can be included (not shown) that fits over the spill containment space 318, attached at surface 322 that can protect the spill containment basin 302 and upper end 312 from the elements.

In an embodiment, the conduit 306 can be made of a non-corrosive material such as aluminum. The conduit can be of a suitable diameter, such as four inches. In an embodiment, the width of the channel 330 (see FIG. 4B) can be just larger than the diameter of conduit 306 so that once conduit 306 is seated within channel 330 through slight deformation of the diameter of the conduit 306 as well as the walls of the channel 330, the walls of channel 330 provide additional gripping force to help clamping means 316 retain the conduit 306 in channel 330. Clamping means 316 can be any suitable structure that might be employed to fixedly retain conduit 306 within channel 330, including brackets, ties, clamps, straps, etc.

Because plastic does not provide the weight of concrete, the interface body 304 of the embodiment of FIG. 4A can be hollow and filled with a weighting material such as water, sand any other suitable material to provide sufficient weight for stability of the attachment interface 300. In an embodiment, fill plug 380a can be opened and used to fill the interface body with the weighting material and drain plug 380b can be opened to drain the weighting material from the interface body 304 to make it easier to move. It will be obvious to those of skill in the art that additional plugs or other well known means can be employed to fill and drain the interface body 304.

Figure 4B:
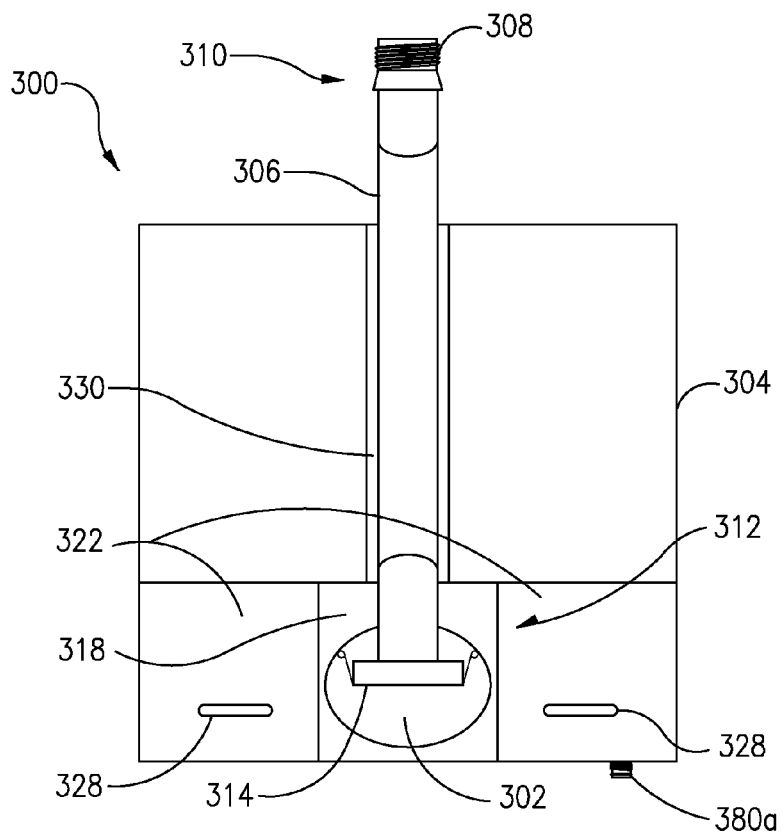
FIG. 4B is top view showing a spill containment basin that is integral with a molded interface body of an embodiment of the invention.

FIG. 4B shows a top view of an embodiment of the pump attachment interface 300. Interface body 304 is shown, having top surface 322, spill containment space 318 therein, which narrows to channel 330, which extends down the length of sloping surface 320. Conduit 306 is disposed on and supported by sloping surface 320, within channel 330. Upper end 312 of conduit 306, having female fitting 314, is disposed within spill containment space 318 and over spill containment basin 302. Lower end 310 extends beyond the end of sloping surface 320 so that adapter fitting 308 is readily accessible. Lifting rings 328 are provided in the top of surface 322 so that the attachment interface 300 can be easily lifted and placed into position by, for example, a fork-lift truck, even while filled with weighting material.

Figure 4C:
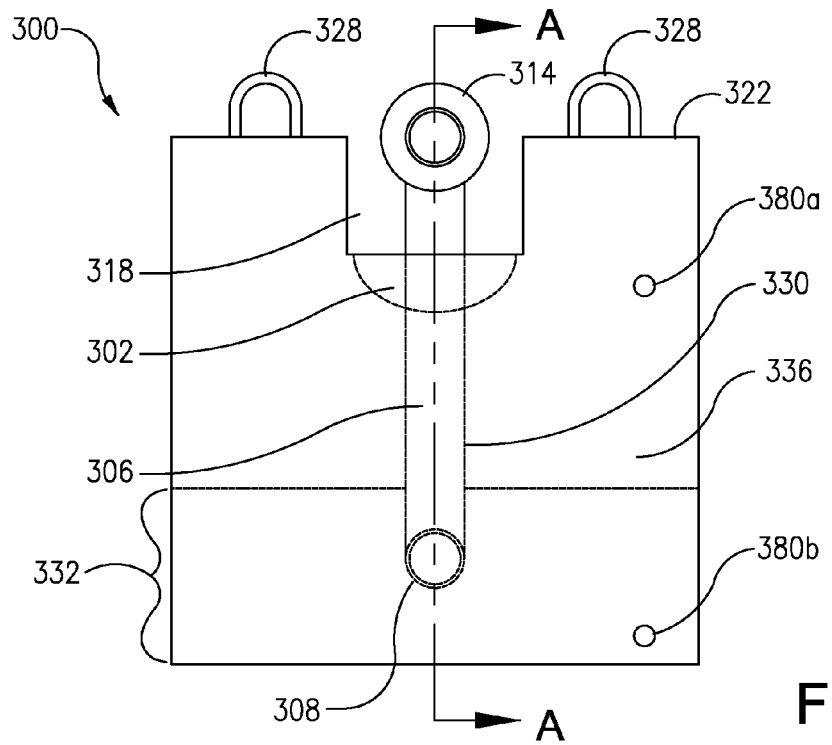
FIG. 4C is a front view showing a spill containment basin that is integral with a molded interface body of an embodiment of the invention.

FIG. 4C is a front view of an embodiment of the pump attachment interface 300 from the perspective of a pumping truck operator. This view shows a front surface 336 that extends from the ground to the top surface 322, and shows coupling 314 of the upper end 312 (see FIG. 4D) of conduit 306 as it would appear to a pump truck operator. The positions of channel 330, conduit 306, lower end 310 (see FIG. 4D), coupling 308 and vertical surface 332, all blocked from view by front surface 336, are shown by dashed lines. Fitting 314 is disposed over the center of the integrated spill containment basin 302.

Figure 4D:
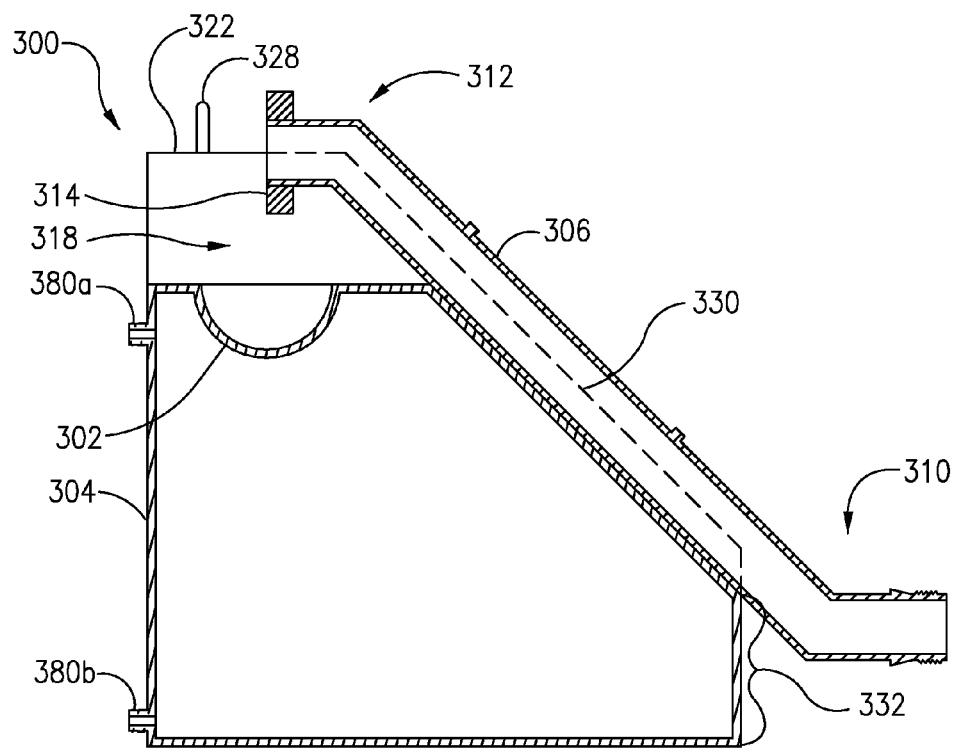
FIG. 4D is a side and cross-sectional view showing a spill containment basin that is integral with a molded interface body of an embodiment of the invention.

FIG. 4D is a cross-sectional side view of the fixed link at line A-A of FIG. 4C that illustrates the integral nature of the components. FIG. 4D illustrates the integral nature of the catch basin 302, the channel 330 and spill containment space 318 with molded hollow interface body 304.

Other modifications and implementations will occur to those skilled in the art without departing from the spirit and the scope of the invention as claimed. Accordingly, the above description is not intended to limit the invention except as indicated in the following claims.

What is claimed is:

1. A pump attachment interface for providing a fixed link between a first line in communication with a fluid reservoir and a second line in communication with a mobile storage tank via a pumping mechanism, the interface comprising:
   an interface body having a sloping surface; and
   a spill containment catch basin coupled with the interface body
   a conduit supported by the sloping surface that elevates the conduit above the ground such that a lower end of the conduit is at a height above the ground that is lower than an upper end of the conduit, the lower end capable of being coupled to the first line, and the upper end capable of being coupled to the second line,
   wherein the interface body is configured to substantially isolate the first line from pulling forces exerted on the second line.

2. The pump attachment interface of claim 1 wherein the interface body is made of solid concrete so that it has sufficient weight to substantially isolate the first line from pulling forces exerted on the second line.

3. The pump attachment interface of claim 1 wherein the sloping surface of the interface body sufficiently elevates the lower end of the conduit from the ground to facilitate coupling of the first line thereto.

4. The pump attachment interface of claim 1 wherein the conduit is supported by the sloping surface within a channel formed in the sloping surface.

5. The pump attachment interface of claim 1 wherein the catch basin is a bucket, and the upper end of the conduit is located inside the bucket.

6. The pump attachment interface of claim 1 wherein the interface body is made of hollow molded plastic and is configured to be filled with a weighting material such that the interface body has sufficient weight to substantially isolate the first line from pulling forces exerted on the second line.

7. The pump attachment interface of claim 1 wherein the conduit includes a coupling at its lower and upper ends to which the first and second lines are detachably coupled respectively.

8. The pump attachment interface of claim 6 further comprising:
   the upper end of the conduit being disposed over the spill containment catch basin.

9. The pump attachment interface of claim 1 wherein the spill containment catch basin is secured within a spill containment space located at a top end of the interface body.

10. The pump attachment interface of claim 1 further comprising:
    lifting rings, embedded in a top surface of the interface body.

11. A pump attachment interface for providing a fixed link between a first line in communication with a fluid reservoir and a second line in communication with a mobile storage tank via a pumping mechanism, the interface comprising:
   an interface body having a sloping surface, the interface body being made of hollow molded plastic;
   a conduit supported by the sloping surface that elevates the conduit above the ground such that a lower end of the conduit is at a lower height above the ground than an upper end of the conduit, the lower end capable of being coupled to the first line, and the upper end capable of being coupled to the second line; and
   a spill containment catch basin, the spill containment catch basin being integrally formed with the interface body, the upper end of the conduit being disposed over the catch basin,
   wherein when the first line and second line are coupled to the conduit, the first line is substantially isolated from pulling forces exerted on the second line.

12. The pump attachment interface of claim 11 wherein the interface body is filled with a weighting material such that the interface body has sufficient weight to substantially isolate the first line from pulling forces exerted on the second line.

13. The pump attachment interface of claim 12 wherein the attachment body has a first plug through which the weighting material may be introduced into the attachment body, and a second plug through which the weighting material may be removed from the attachment body.

14. The pump attachment interface of claim 13 wherein the weighting material is water.

15. The pump attachment interface of claim 11 wherein the height of the upper end is such that it can be conveniently reached by a user standing on the ground.

16. The pump attachment interface of claim 11 wherein the conduit is supported by the sloping surface within a channel integrally formed within the sloping surface.

17. The pump attachment interface of claim 16 wherein the conduit is retained within the channel by forces exerted on the conduit by walls of the channel.

18. A pump attachment interface for providing a fixed link between a first flexible line in communication with a fluid reservoir and a second line in communication with a mobile storage tank via a pumping mechanism, the interface comprising:
   an interface body having a sloping surface, the interface body being made of concrete;
   a rigid conduit supported by the sloping surface that elevates the conduit above the ground such that a lower end of the conduit is at a lower height above the ground than an upper end of the conduit, the lower end capable of being coupled to the first line, and the upper end capable of being coupled to the second line; and
   a spill containment catch basin, the spill containment catch basin being supported within a spill containment space, the upper end of the conduit being disposed through and within the spill containment catch basin,
   wherein when the first line and second line are coupled to the conduit, the first line is substantially isolated from pulling forces exerted on the second line by at least the weight of the concrete attachment body.

19. The pump attachment interface of claim 18 wherein the sloping surface of the interface body sufficiently elevates the lower end of the conduit from the ground to facilitate coupling of the first line thereto.

20. The pump attachment interface of claim 18 wherein the conduit is supported by the sloping surface within a channel integrally formed within the sloping surface, the conduit being retained within the channel by a clamp.

\* \* \* \* \*